United States Patent
Hotta et al.

(10) Patent No.: US 7,181,189 B2
(45) Date of Patent: Feb. 20, 2007

(54) VEHICULAR REMOTE CONTROL SYSTEM AND TIRE PRESSURE MONITORING SYSTEM

(75) Inventors: Shinji Hotta, Nagoya (JP); Toshihiko Yoshimura, Toki (JP)

(73) Assignee: Omron Corporation, Kyoto (JP)

( * ) Notice: Subject to any disclaimer, the term of this patent is extended or adjusted under 35 U.S.C. 154(b) by 86 days.

(21) Appl. No.: 11/021,727

(22) Filed: Dec. 23, 2004

(65) Prior Publication Data

US 2005/0162259 A1 Jul. 28, 2005

(30) Foreign Application Priority Data

Dec. 25, 2003 (JP) .............................. 2003-430447

(51) Int. Cl.
  *H04B 1/16* (2006.01)
  *B60C 23/00* (2006.01)
  *B60C 23/02* (2006.01)
  *B60C 1/00* (2006.01)

(52) U.S. Cl. .................. 455/343.3; 455/352; 455/345; 340/445; 340/442; 340/449; 73/146.2

(58) Field of Classification Search ............ 455/343.3, 455/352, 345, 297.1, 95, 410, 411, 418, 142, 455/143, 343.2, 343.4, 456.1–456.6, 68, 455/574, 354; 340/445, 447, 442, 449, 10.33, 340/825.72, 448, 10.3; 73/146.2, 146.5, 73/146.4, 146.3
See application file for complete search history.

(56) References Cited

U.S. PATENT DOCUMENTS

| | | | |
|---|---|---|---|
| 5,331,325 A * | 7/1994 | Miller ........................ 341/176 |
| 6,034,597 A | 3/2000 | Normann et al. |
| 6,457,337 B1 * | 10/2002 | Hattick et al. ............. 70/278.3 |
| 6,469,621 B1 * | 10/2002 | Vredevoogd et al. ....... 340/445 |
| 6,922,142 B2 * | 7/2005 | Norimatsu .................. 340/447 |
| 2004/0130457 A1 * | 7/2004 | Ueda et al. ............ 340/825.72 |
| 2005/0191966 A1 * | 9/2005 | Katsuta ....................... 455/68 |

FOREIGN PATENT DOCUMENTS

KR 2003-0026725 4/2003

OTHER PUBLICATIONS

Korean Office Action mailed Dec. 14, 2005; Application No. 10-2004-0033863 (6 pages).

* cited by examiner

*Primary Examiner*—Melody Mehrpour
(74) *Attorney, Agent, or Firm*—Osha Liang L.L.P.

(57) ABSTRACT

A vehicular remote control system has a mobile unit, a vehicle unit for establishing bidirectional wireless communication with the mobile unit, wherein the vehicle unit is able to transmit a wireless signal to the mobile unit through transmission antennas provided at a plurality of positions of a vehicle, and operational intention detector, provided at the plurality of positions of the vehicle corresponding to the transmission antennas, for detecting operational intention of a user approaching the positions. When a user's operational intention is detected, a predetermined request signal is transmitted from the vehicle unit to the mobile unit through a first transmission antenna, and the vehicle unit transmits an interrupt signal for preventing reception of the request signal, through a second transmission antenna.

7 Claims, 13 Drawing Sheets

Fig. 2

| Transmission data | 1 | 0 | 0 | 1 | 1 | 0 | Reception is acceptable or not |
|---|---|---|---|---|---|---|---|
| Right LF transmission ASK modulation | | | | | | | — |
| Left LF transmission ASK modulation | | | | | | | — |
| Medium point ASK modulation | | | | | | | × |
| ASK modulation near the window of the right seat's door | | | | | | | ○ |
| ASK modulation near the window of the left seat's door | | | | | | | × |

| Transmission data | 1 | 0 | 0 | 1 | 1 | 0 | Reception is acceptable or not |
|---|---|---|---|---|---|---|---|
| Front LF transmission ASK modulation | | | | | | | — |
| Rear LF transmission ASK modulation | | | | | | | — |
| A area ASK | | | | | | | O |

Fig. 10

| Transmission data | 1 | 0 | 0 | 1 | 1 | 0 | Reception is acceptable or not |
|---|---|---|---|---|---|---|---|
| Front left LF transmission ASK modulation | | | | | | | — |
| Front right LF transmission ASK modulation | | | | | | | — |
| Rear left LF transmission ASK modulation | | | | | | | — |
| Rear right LF transmission ASK modulation | | | | | | | — |
| ASK modulation near the front left tire | | | | | | | ○ |
| ASK modulation near the front right tire | | | | | | | × |

Fig. 13

| Transmission data | | 1 | 0 | 0 | 1 | 1 | 0 | | Reception is acceptable or not |
|---|---|---|---|---|---|---|---|---|---|
| Front left LF transmission ASK modulation | | ▨ | ▨ | ▨ | ▨ | ▨ | ▨ | | — |
| Front right LF transmission ASK modulation | | | ▨ | | | | | | — |
| Rear left LF transmission ASK modulation | | | | ▨ | | | | | — |
| Rear right LF transmission ASK modulation | | | | | | | ▨ | | — |
| ASK modulation near the front left tire | | ▨ | ▨ | ▨ | ▨ | ▨ | ▨ | | ○ |
| ASK modulation near the front right tire | | | ▨ | | | | | | × |

VEHICULAR REMOTE CONTROL SYSTEM AND TIRE PRESSURE MONITORING SYSTEM

BACKGROUND OF THE INVENTION

Field of the Invention

The present invention relates to a vehicular remote control system and a tire pressure monitoring system (TPMS). As the remote control system, there is a convenient system (smart entry system) enabling operations such as locking/unlocking or opening/closing of a door or a trunk of a vehicle without using any mechanical key through one-touch operation or automatically, in bidirectional communications between a mobile unit and a vehicle unit.

As a typical example of this vehicular remote control system, there is a convenient system (smart entry system; a development type of a basic keyless entry system) which performs the locking/unlocking operations of a door of a vehicle without using any mechanical key through one-touch operation or automatically.

As this smart entry system, as disclosed in Patent Article 1 (Japanese Patent Laid-Open No. 1998-308149) and Patent Article 4 (Japanese Patent Laid Open No. 2003-20838), there has been known the art for automatically locking/unlocking a door of a vehicle and the like under the following conditions: a user's approach or touch to a door handle outside a door or a user's operation of a button provided on the vicinity of the door handle is judged to be the user's intentional or accidental will to operate a vehicle, and this triggers the bidirectional communications between a mobile unit carried by the user and a vehicle unit; that is the vehicle unit sends a request signal to the mobile unit and the mobile unit replies an answer signal including a proper ID code (authentication code) to the vehicle unit.

Patent Article 2 (Japanese Patent Laid-Open No. 2002-77972) discloses the technique in which with a plurality of antennas provided inside and outside a vehicle, it is judged which antenna has established communication with a mobile unit, so as to recognize the position of the mobile unit, that is, whether the mobile unit is inside the vehicle or outside the vehicle, alternatively, with a plurality of antennas provided inside a vehicle, the position of the mobile unit is more accurately judged according to the communication condition (receiving intensity) between these antennas and the mobile unit.

Further, Patent Article 3 (Japanese Patent Laid-Open No. 2002-46541) discloses the technique in which antennas, for example, arranged in the front and rear portions inside a vehicle transmit signals at once so as to completely cover a wide range of communicable area with a mobile unit.

FIG. 6 is a view for use in describing the conventional example of this smart entry system.

In this example, as illustrated in FIG. 6A, exterior antennas (right exterior antenna and left exterior antenna) are respectively provided on the both lateral sides of a vehicle 1 (for example, inside the B pillar or within a door mirror) and interior antennas (front interior antenna and rear interior antenna) are respectively provided on the front portion (front seat) and the rear portion (rear seat) within the vehicle 1. These antennas on the vehicle side are to transmit a down signal from a vehicle unit to a mobile unit (for example, it corresponds to the above request signal) and a receiving antenna on the vehicle side which receives an up signal from the mobile unit to the vehicle unit (for example, it corresponds to the above answer signal) is separately provided on a control unit (ECU), not illustrated, for example, which forms the vehicle unit in this case. As the carrier wave of the down signal, LF (long frequency) is used which makes it easy to wake up the mobile unit and to transmit electricity to the mobile unit and also makes it easy to set a boundary of communicable area, and as the carrier wave of the up signal, UHF (ultra high frequency) is used which can transmit a large amount of information to a wide range.

In this example, the operation proceeds as illustrated in FIG. 6B. When a driver carrying a mobile unit, not illustrated, with him or her approaches a door near a driver's seat (right door) of a locked vehicle and holds out his or her hand in order to try to open the door, a door handle sensor on the side of the driver's seat, not illustrated, detects this, and the detection signal works as a trigger of the control unit forming the vehicle unit, not illustrated. Upon receipt of this trigger, according to a control of the control unit, after elapse of the time T1, the right exterior antenna which a trigger occurred starts transmitting the request signal. After elapse of the time T2 taken to transmit the request signal from the right exterior antenna and to receive the answer signal from the mobile unit in reply to this, the left exterior antenna starts transmitting the request signal. Then, after elapse of the time T3 taken to transmit the request signal from the left exterior antenna and to receive the answer signal from the mobile unit, the front interior antenna and the rear interior antenna start transmitting the request signal. After finishing the transmission of the request signal from these interior transmission antennas and the receiving operation of the answer signal from the mobile unit in replay to this, the control unit performs the control processing for unlocking the door (for example, the output processing of a control signal for operating a door lock actuator in an unlocking mode) when the condition of automatically unlocking the door is satisfied, and after elapse of the times T4 and T5 taken for these operations, a series of operations (automatic unlocking operation) are completed.

As for the locking operation of a door, when a predetermined trigger is entered, automatic locking is performed through a plurality of communications depending on the case from each antenna as illustrated in FIG. 6B. For example, after the door is closed, when a door handle sensor detects the man's hand moving away from the door handle outside the door, this works as a trigger, followed by the sequential communications from each antenna similarly, and when the condition of automatically locking the door is satisfied, the control processing for locking the door (for example, the output processing of a control signal for operating the door lock actuator in a locking mode) is performed.

Here, the condition of automatically unlocking a door includes that a proper answer signal including a proper ID code is received from the mobile unit and further that the mobile unit is judged to be actually positioned on the side where the trigger is entered from the exterior (in the above case, on the side of a driver's seat). It is not preferable that the unlocking operation is performed even when the mobile unit is positioned on the opposite side to the side of the trigger input or even when the mobile unit is positioned within the vehicle.

This is because even if using the LF bandwidth, it is difficult to restrict the communicable area of the exterior antenna to a specified side outside the vehicle and as illustrated in FIG. 6A, a wide area inside the vehicle can be a communicable area and electric waves can leak outside the vehicle on the opposite side (B area).

Therefore, in a simple automatic unlocking mode based on the ID authentication only through communication from an exterior antenna on the side of the trigger input, despite of a driver's intentional locking operation inside the vehicle with the mobile unit, when someone triggers the door handle operation from the outside, the door is unlocked against the driver's will, or when a door is locked with the mobile unit left behind within the vehicle, someone can trigger the door handle operation from the outside and unlock the door. This deteriorates the anticrime performance and causes an unnecessary automatic unlocking operation by mischief of a child and the like. When a driver carrying the mobile unit stands near the door of the driver's seat (within the B area), even a door handle operation and the like on the side of a front passenger's seat triggers the automatic unlocking operation, and an unwanted person may break into the vehicle from the opposite side, which is a serious problem on the viewpoint of crime prevention.

Here, the condition of automatically locking a door includes that a proper answer signal including a proper ID code is received from a mobile unit and that the mobile unit is judged not to be within the vehicle or to be moved away from the communicable area of the exterior antenna (in short, a driver is moved away from the vehicle).

With the mobile unit left within the vehicle, when the locking operation is performed nevertheless, the mobile unit will be locked in. When a driver carrying the mobile unit is near the vehicle and nevertheless the locking operation is performed, an unnecessary automatic locking operation would be performed by the occasional presence of a driver near the vehicle, which is inconvenient.

In the conventional art, as illustrated in FIG. 6B, at least one communication with the mobile unit is performed sequentially from each antenna, and ID authentication is performed through one of the above communications so as to judge the position of the mobile unit (inside or outside the vehicle, and right or left side of the vehicle) according to the communication state. In the example of FIG. 6B, in order to realize the justification of the detectable area of communication inside the vehicle (to make up for the A area outside the communicable area) in the principle of Patent Article 3, signals are simultaneously supplied from the front and rear interior antennas, and when there are a plurality of interior antennas, signals may be sequentially supplied from these antennas. In a compact car, there may be one interior antenna.

In the above-mentioned conventional vehicular remote control system, each delay time (time lag) from generation of trigger to execution of a predetermined processing operation (for example, locking/unlocking control of a door of a vehicle) sums up to the total of the time T1 to T5, a fairly long time, in the case of FIG. 6B. In particular, when there are a lot of exterior antennas (for example, when exterior antennas for left and right doors and exterior antennas for a rear door or a trunk are provided in order to also control the rear door or the trunk similarly), communications between the respective exterior antennas and the mobile unit are sequentially established and the time period as the time T2 and T3 will increase according to an increase in the number of the antennas, which results in a long delay time. Then, there has been a request to save the time period required for each communication with each transmission antenna as much as possible, to shorten the delay time further, and to improve response ability.

The device disclosed in Patent Article 4 is characterized by transmitting a request signal from a transmission antenna on the side where a trigger occurred and transmitting a prohibition signal for prohibiting return of an answer signal from another transmission antenna on the side of the vehicle unit at a feeble output. This helps to shorten the above delay time much more than in the case of sequentially performing each bidirectional communication between the respective transmission antennas and the mobile unit.

In this device, however, as apparent from FIG. 3 of Patent Article 4 and the like, the processing operation on the side of the mobile unit is to check whether the prohibition signal has been received within a predetermined hour after receiving a request signal and to return an answer signal when the prohibition signal has not been received. The processing operation on the side of the vehicle unit is, as shown in FIG. 2 of the Patent Article 4 and the like after generation of a trigger, to finish transmitting a request signal from a transmission antenna on the side where the trigger occurred, to transmit the prohibition signal from another transmission antenna on the side of the vehicle unit, further to receive a proper answer signal from the mobile unit, and to control an unlocking operation under condition that the proper answer signal has been received. This takes a much more additional time necessary to at least transmit and receive the prohibition signal and to check the reception of the prohibition signal than the basic operation time (for example, the total of the time T1, T2, and T5 in FIG. 6B) required to transmit and receive a request signal and an answer signal simply at once, to check them, and to control the unlocking operation based on the check result. It has a problem that the whole delay time becomes fairly long.

As a system similar to the smart entry system from viewpoint of the bidirectional communication in a vehicle, there is a tire pressure monitoring system (TPMS) and this system has a similar problem.

The TPMS is a system comprising a controller on the vehicle side capable of transmitting a wireless signal through transmission antennas on the vehicle side respectively provided in the vicinity of specified tires and a sensor unit, provided in each tire of the vehicle, capable of measuring the air pressure of each tire and transmitting the measurement result as a wireless signal, in which the controller on the vehicle side transmits a request signal to the sensor unit of a tire corresponding to the transmission antenna on the vehicle side at a predetermined position at a predetermined timing, and upon receipt of this, the sensor unit transmits an answer signal including the measurement result to the controller on the vehicle side, and the controller on the vehicle side, upon receipt of this, reads out the measurement result and controls the output of alarm in the case of, for example, abnormal air pressure.

In this system, when a transmission antenna on the vehicle side at a predetermined position transmits a request signal so as to communicate with the sensor unit of a corresponding tire, depending on the case, the sensor unit of another tire may receive the request signal and return an answer signal, so that the controller on the vehicle side cannot receive an answer signal normally and it may receive an answer signal from another tire by mistake, hence to make it impossible to judge which tire this signal of air pressure corresponds to. In order to solve this problem of getting communication intricate, for example, an inherent identification code is set for every tire, and the identification code, included in a request signal, is transmitted, and in the sensor unit of a tire, the identification code included in the received request signal is collated with the identification code previously stored, and only when the collation results in agreement, an answer signal is returned. In this case, however, it takes much time to have communication because of the time required to collate the identification code and response ability will be deteriorated (a delay time required to monitor the tire pressure becomes long). In this case, the setting of a sensor unit is various for every tire and management of the sensor units becomes difficult and workability at the assembly time is deteriorated.

The invention aims to provide a vehicular remote control system such as a smart entry system that can shorten a delay time from the time of generating a trigger to the time of executing a predetermined processing operation further than the conventional system and to provide a tire pressure monitoring system that can solve the above-mentioned problem of getting the communication intricate without harmful effect.

SUMMARY OF THE INVENTION

The vehicular remote control system of this invention is a vehicular remote control system having a mobile unit portable by a user, a vehicle unit for establishing bidirectional wireless communication with this mobile unit, which can transmit a wireless signal to the mobile unit through transmission antennas provided at a plurality of positions of a vehicle, and operational intention detection means, provided at a plurality of positions of the vehicle corresponding to the transmission antennas, for detecting operational intention of a user approaching the positions, in which when a user's operational intention is detected by the operational intention detecting means, this works as a trigger, a predetermined request signal is transmitted from the vehicle unit to the mobile unit through the transmission antenna arranged at the corresponding position of the vehicle, and the vehicle unit performs a predetermined processing operation according to the received result of an answer signal transmitted from the mobile unit to the vehicle unit in reply to this request signal, and it is characterized in that at the same time when the request signal is transmitted through the transmission antenna at the position where the trigger occurred, the vehicle unit transmits an interrupt signal for preventing reception of the request signal, through the transmission antenna arranged at any other position than the above position, at least at one moment of a time period during which the request signal is being transmitted.

Although the "transmission antenna" means an antenna used for transmitting a signal at least from the vehicle unit to the mobile unit, it is needless to say that it may be used as a receiving antenna for receiving a signal from the mobile unit to the vehicle unit.

The "request signal" does not necessarily include the data requiring return from the mobile unit, but this signal has only to be a signal causing the mobile unit to return an answer signal. For example, a wake up signal for making the mobile unit in a standby state (sleep state) that is in the power saving mode, into the normal operation mode may be used as the request signal.

The "request signal" has only to be a signal of digital wireless method to be transmitted after modulation of the carrier wave with a pulse string corresponding digital data (original signal data).

Here, as the modulation method, what is called, ASK (amplitude shift keyed) modulation or FSK (frequency shift keyed) modulation can be used.

As the "interrupt signal", although an inverse signal with the pulse string at the modulation inverted as for the request signal of digital wireless method is preferable, as far as it can prevent the reception of the request signal properly, any type will do.

In addition to the general vehicle such as four-wheeled vehicle, the "vehicle" may include a carriage (for example, small craft and the like) equivalent to the general vehicle.

In the vehicular remote control system of the invention, when a request signal is transmitted from a transmission antenna at the position where a trigger occurred, an interrupt signal (for example, the inverse signal with the pulse string at the modulation inverted with respect to the request signal) for preventing the reception of this request signal is transmitted from the transmission antenna arranged at any other position than the above position, simultaneously with the request signal. Therefore, the request signal cannot be received (for example, a data inverted signal with respect to the normal request signal is received) at any place (for example, on the left side of the vehicle opposite to the right side of the vehicle where the trigger occurred) other than the above position where the trigger occurred and the answer signal will not be returned therefrom. For example, in the example of FIG. 6A, when a request signal is transmitted from the transmission antenna (right exterior antenna) at the position where the trigger occurred, even when the mobile unit is in the above-mentioned B area (electric wave leaking area) on the left side of the vehicle, the mobile unit is prevented from receiving the normal request signal owing to the above interrupt signal and any answer signal will not be returned from the mobile unit.

According to the vehicular remote control system of the invention, it is not necessary to establish individual communication with the transmission antennas having no trigger (for example, the transmission antenna on the opposite side) in order to judge the position of the mobile unit nor individually transmit the above-mentioned prohibition signal from the transmission antennas having no trigger. Therefore, the whole delay time can be shortened much more than according to the conventional technique. As described later, depending on the case, it is not necessary to establish individual communication with any transmission antennas (for example, including the interior antenna) other than that one at the position where the trigger occurred, and in this case, the delay time can be remarkably shortened to the same degree as the basic operation time (the time required for the basic operation such as transmitting a request signal from the transmission antenna where a trigger occurred and performing predetermined control processing according to the answer signal from the mobile unit in reply to the request signal).

In a preferred mode of the vehicular remote control system of the invention, the interrupt signal is transmitted from the respective transmission antennas arranged at any other positions than the specified position, with time difference (namely, not transmitted at once). In this case, the load of the transmitting circuit can be decreased extremely. Otherwise in the mode of simultaneously transmitting the interrupt signal from the respective transmission antennas arranged at any other positions than the specified position, the load of the transmitting circuit becomes enormous when there are a plurality of the transmission antennas other than that one arranged at the specified position. By transmitting it with time difference, it is always one transmission antenna that is transmitting the interrupt signal, which decreases the load of the transmitting circuit remarkably.

In another preferred mode, the processing operation is the control processing concerned about locking/unlocking or opening/closing a door or a trunk of a vehicle. The transmission antenna and the operational intention detecting means are provided on the both sides or the rear side of the vehicle corresponding to the doors or the trunk of the vehicle and the operational intention means the locking/unlocking or opening/closing of the door or the trunk of the vehicle. In this case, it is the convenient vehicular smart entry system for automatically performing the locking/unlocking or opening/closing of the door or the trunk of the vehicle without using a mechanical key and a system of good response ability with the delay time shortened as mentioned above can be realized.

The tire air pressure monitoring system of the invention is a tire air pressure monitoring system having a controller on a vehicle side which can transmit a wireless signal through each transmission antenna on the vehicle side provided for every specified tire of the vehicle in the vicinity of each corresponding tire, and a sensor unit, provided in each tire of the vehicle, which can measure air pressure of each tire and transmit the measurement result as wireless signal, in which the controller on the vehicle side transmits a request signal to the sensor unit of the corresponding tire through the transmission antenna on the vehicle side at a predetermined position at a predetermined timing and upon receipt of this, the sensor unit transmits an answer signal including the measurement result to the controller on the vehicle side, and it is characterized in that at the same time when transmitting the request signal through the transmission antenna on the vehicle side at the predetermined position, the controller on the vehicle side transmits an interrupt signal for preventing reception of the request signal through the other transmission antenna on the vehicle side arranged at any position other than the above predetermined position, at least at one moment of a time period during which the request signal is being transmitted.

It is preferable that the interrupt signal is an inverse signal with the pulse string at the modulation inverted with respect to the request signal of digital wireless method.

In the tire air pressure monitoring system of the invention, when transmitting a request signal from the transmission antenna on the vehicle side at the specified position, an interrupt signal (for example, the inverse signal) for preventing the reception of the request signal is transmitted from the transmission antenna on the vehicle side arranged at any other position than the specified position, simultaneously with the request signal. Therefore, the sensor unit of a tire other than the tire at the specified position can be prevented from receiving the request signal normally and no answer signal will be returned.

According to the tire air pressure monitoring system of the invention, it is possible to solve the above-mentioned problem of making communication intricate without undesirable effect. In other words, special processing for preventing the above problem of making communication intricate (for example, processing of setting the individual identification code for every tire and checking the identification code in the sensor unit) becomes unnecessary. According to this, response ability is improved (the delay time required to monitor the tire air pressure is shortened), and since it is not necessary to change the setting of the sensor unit for every tire, management of the sensor units becomes easy and the workability at the assembly time is improved.

In another preferred mode of the tire air pressure monitoring system, the interrupt signal is transmitted from the respective transmission antennas on the vehicle side arranged at any other position than the specified position, with time difference (namely, not transmitted at once). In this case, the load of the transmitting circuit can be decreased extremely. Otherwise in the mode of simultaneously transmitting the interrupt signal from the respective transmission antennas on the vehicle side arranged at any other positions than the specified position, the load of the transmitting circuit becomes enormous when there are a plurality of the transmission antennas on the vehicle side (in the case of four-wheeled vehicle, there are generally three antennas) arranged at any other positions than the specified position. By transmitting it with time difference, it is always one transmission antenna on the vehicle side that is transmitting the interrupt signal, which decreases the load of the transmitting circuit remarkably.

According to the vehicular remote control system of the invention, it is not necessary to establish individual communication with the transmission antennas having no trigger in order to judge the position of the mobile unit nor individually transmit the above-mentioned prohibition signal from the transmission antennas having no trigger. Therefore, the whole delay time can be shortened more remarkably than according to the conventional technique.

According to the tire air pressure monitoring system of the invention, the above problem of making communication intricate can be solved without undesirable effect.

In any system, the mode of transmitting an interrupt signal with time difference can reduce the load of the transmitting circuit remarkably.

BRIEF DESCRIPTION OF THE DRAWINGS

FIG. 2 is a view for use in describing the transmission waveform and the reception waveform of a signal to be transmitted from an exterior antenna.

FIG. 10 is a view for use in describing the transmission waveform and the reception waveform of a signal to be transmitted from a transmission antenna on the vehicle side of the tire air pressure monitoring system.

FIG. 13 is a view for use in describing the transmission waveform and the reception waveform of a signal to be transmitted from a transmission antenna on the vehicle side of the tire air pressure monitoring system (second embodiment).

DETAILED DESCRIPTION OF THE INVENTION

Hereinafter, preferred embodiments of the invention will be described based on the drawings.

(Embodiment of a Vehicular Remote Control System)

At first, a first embodiment of a vehicular remote control system will be described.

Figure 3:
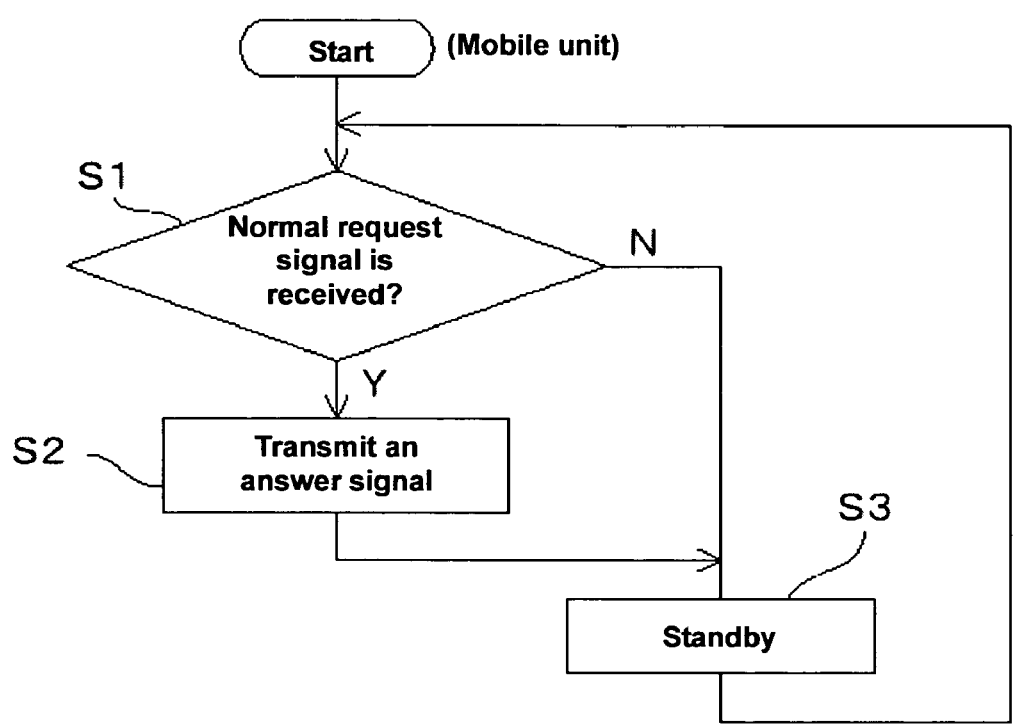
FIG. 3 is a flow chart for use in describing the operation of a mobile unit.
Figure 4:
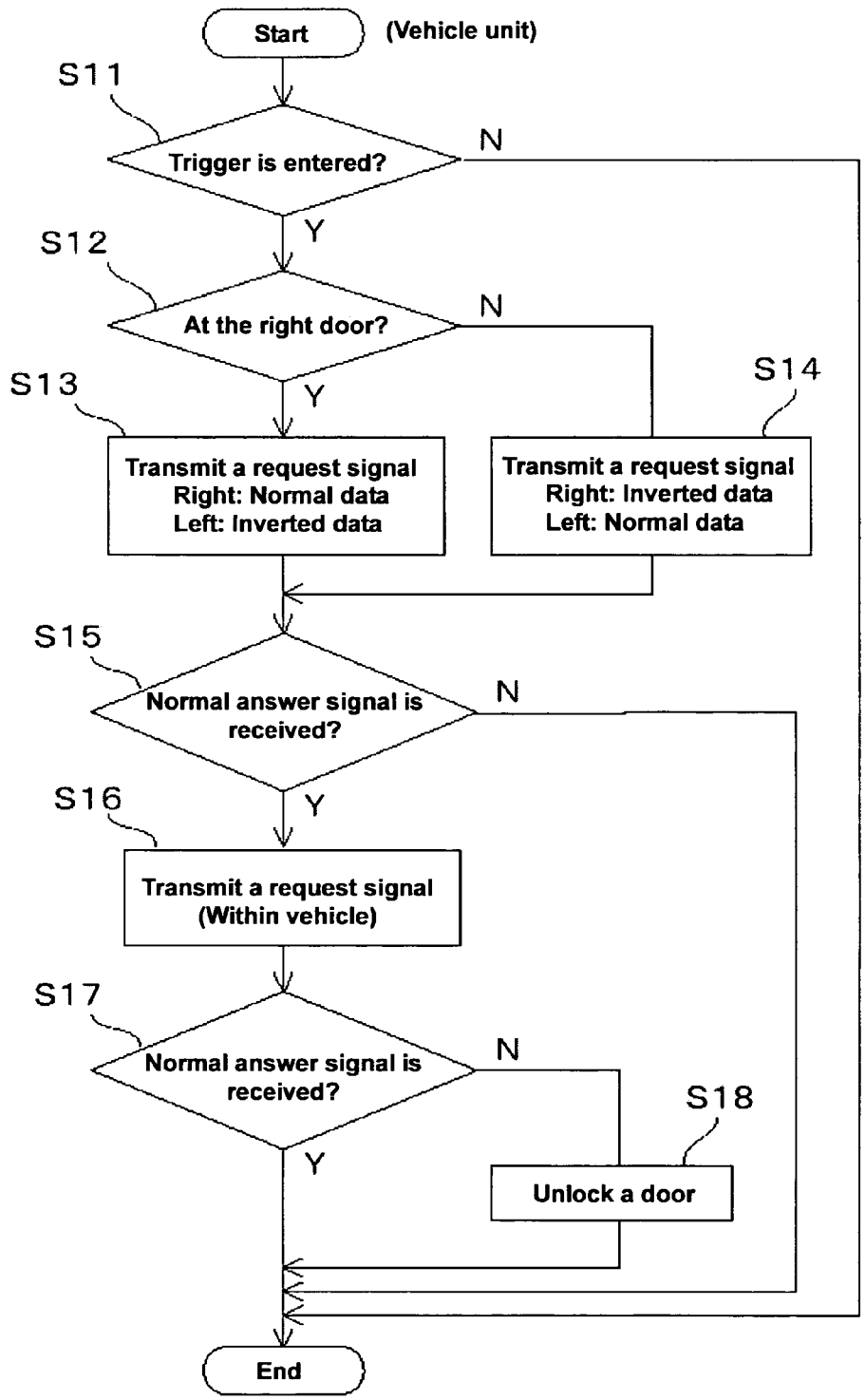
FIG. 4 is a flow chart for use in describing the operation of a vehicle unit.

FIG. 1 is a view for use in describing the schematic structure and operation of the vehicular remote control system (vehicular smart entry system) of this embodiment. FIG. 2 is a view for use in describing a signal to be transmitted from an exterior antenna. FIG. 3 and FIG. 4 are flow charts for use in describing the operations of a mobile unit and a vehicle unit respectively. FIG. 5 is a view for use in describing a communicable area of an interior antenna and a signal to be transmitted from the interior antenna.

Figure 1A:
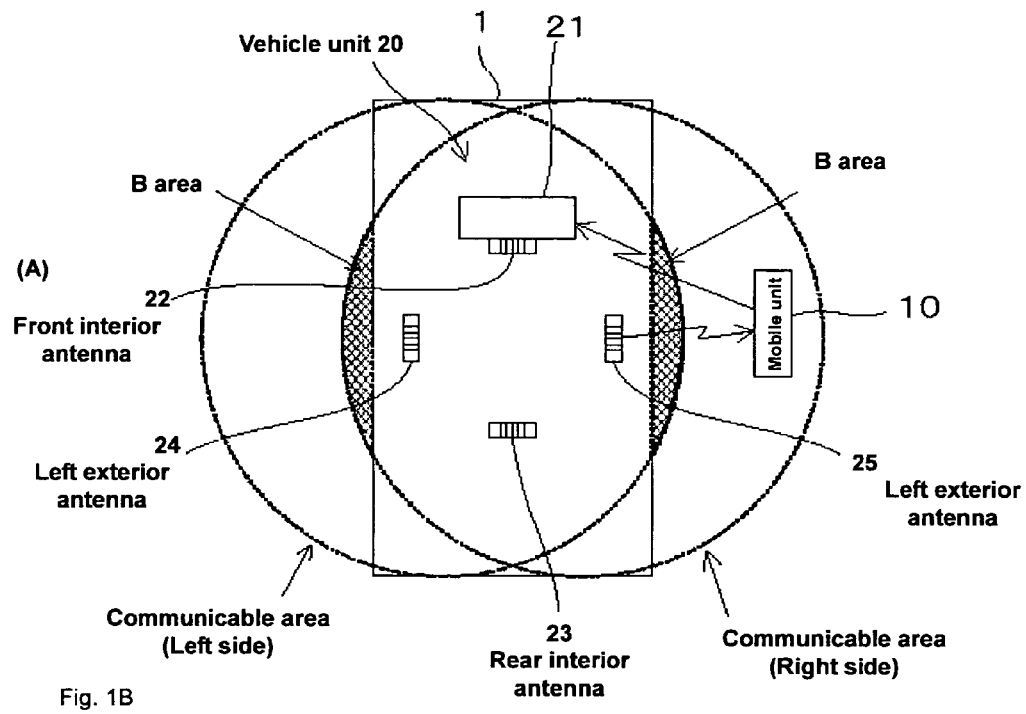
FIG. 1 is a view for use in describing the schematic structure and operation of a vehicular smart entry system.

As illustrated in FIG. 1A, this system comprises a mobile unit 10 portable by a user, a vehicle unit 20 for communicating with the mobile unit 10 in a digital wireless method, and operational intention detecting means not illustrated.

The operational intention detecting means are respectively provided in a driver's seat (right side in a vehicle) and a front passenger's seat (left side in a vehicle) in this case. It is formed, for example, by a sensor (for example, that one disclosed in the above-mentioned Patent Article 1) which detects the human body of a user approaching or contacting a door handle outside the door near the driver's seat or the front passenger's seat, or a switch including an operation button in the vicinity of the door handle.

The mobile unit 10 comprises an antenna and a receiving circuit (not illustrated) for receiving a request signal from the vehicle unit 20, an antenna and a transmitting circuit (not illustrated) for transmitting an answer signal to the vehicle unit 20 at a predetermined frequency, a controlling circuit (not illustrated) including a microcomputer for controlling processing of the whole mobile unit and storing ID code and the like, an internal battery (not illustrated), a supply circuit (not illustrated) for supplying the power of this internal battery to the elements of consuming electric power (the receiving circuit, the transmitting circuit, the controlling circuit and the like), and a power controlling circuit (not illustrated) for controlling the power. A locking switch and an unlocking switch (not illustrated) included in a push button operation unit is provided on the operational surface of the mobile unit 10.

As the storing means of the ID code, the controlling circuit of the mobile unit 10 has writable, erasable, and non-volatile storing means on the mobile side (for example, $E^2PROM$; not illustrated).

A microcomputer forming the controlling circuit is always in a standby mode of power saving as described later, and it operates properly switching from the standby mode to the normal mode (working mode not the standby mode). Also when the locking switch or the unlocking switch is operated in the standby mode, the controlling circuit moves to the normal mode, so as to accept this switching operation.

The controlling circuit of the mobile unit 10 has a function of performing the following processing according to the setting of the operation program of the microcomputer.

For example, when receiving a signal at more than a defined intensity at a defined frequency corresponding to a request signal (before demodulation), it moves to the normal mode, hence to perform the receiving processing of this signal, and as illustrated in FIG. 3, it is judged whether this signal is a normal request signal or not (Step S1). More specifically, the received signal (binary data string after demodulation) is analyzed to check whether the same data as the ID code and the like stored in the storing means on the mobile side is included in a predetermined position (for example, ID unit) of the received signal, and when it is included, it is judged to be the normal request signal.

When it is judged to be the normal request signal in Step 1, this step proceeds to Step S2, where an answer signal including the ID code stored in the storing means on the mobile side is transmitted predetermined number of times. Alternatively, when it is not judged to be the normal request signal in Step S1, the step proceeds to Step S3.

In Step S3, it returns to the standby mode, waiting for another signal input.

The mobile unit 10 has a function of transmitting the ID code and a locking instruction signal or an unlocking instruction signal including the data of a locking instruction or an unlocking instruction when the locking switch or the unlocking switch is operated. When the locking instruction signal or the unlocking instruction signal is transmitted and received by the vehicle unit 20, the ID code is collated and checked through a control function of the vehicle unit 20 and the operation of locking or unlocking the door of the vehicle 1 is performed. The system of this embodiment formed by the mobile unit 10 and the vehicle unit 20 is designed to realize also the same function as that of the general keyless entry system (of the elementary single directional communication method).

On the other hand, the vehicle unit 20 comprises a control unit 21, interior antennas (front interior antenna 22 and rear interior antenna 23), exterior antennas (left exterior antenna 24 and right exterior antenna 25), and a receiving antenna (not illustrated), as shown in FIG. 1A. The receiving antenna is, for example, built in the control unit 21.

The control unit 21 comprises a controlling circuit including a microcomputer (not illustrated), a transmitting circuit (not illustrated) for transmitting a request signal, and a receiving circuit (not illustrated) for receiving an answer signal.

The controlling circuit comprises a microcomputer and further comprises writable, erasable, non-volatile storing means on the vehicle side (for example, $E^2PROM$; not illustrated) as the storing means of the ID code and the like. The controlling circuit restrains the electric power consumption to the minimum by intermittently working at a predetermined cycle.

The controlling circuit of the control unit 21 forming the vehicle unit 20 has a function of performing the processing operation for automatic unlocking as follows according to the setting of the operation program of the microcomputer.

Every time it works intermittently, it starts the processing shown in FIG. 4. First, in Step S11, it is judged whether there is a trigger to automatically unlocking a vehicle door (in a door locked state, whether one of the above-mentioned operational intention detecting means provided on the driver's seat and the front passenger's seat becomes active or not), and when there is a trigger, this step proceeds to Step S12, while when there is no trigger, the processing is finished.

In Step S12, it is judged where the trigger occurred; on the driver's seat (right side) or on the front passenger's seat (left side), and when it occurred on the right side, this step proceeds to Step S13, while when it occurred on the left side, this step proceeds to Step S14.

In Step S13, a defined request signal is transmitted from a transmission antenna on the right side (right exterior antenna 25) where the trigger occurred and simultaneously an inverse signal (interrupt signal) is transmitted from a transmission antenna on the opposite side (left exterior antenna 24). Although the inverse signal as the interrupt signal may be transmitted during the whole time period when a request signal is being transmitted, it can be transmitted at least at one moment of the time period during which a request signal is being transmitted. Even in one moment, the inverse signal can prevent itself from being received as the normal request signal. When there are three and more transmission antennas and there are two and more transmission antennas for transmitting interrupt signals (for example, operational intention detecting means and transmission antenna are provided also on a rear seat door and/or a trunk), it is preferable that each interrupt signal is output from each transmission antenna with time difference (interrupt signals are sequentially transmitted from the respective transmission antennas and they are not transmitted at once), and this design can reduce a load of the transmitting circuit.

The inverse signal is such a signal that the pulse string modulated (digital signal) as for the normal request signal is inverted. The uppermost in FIG. 2 shows an example of the binary data string (100110) of the request signal. The second line from the top in FIG. 2 is a normal pulse string (rising edge is "1" and falling edge is "0") corresponding to this binary data string, and a signal obtained by ASK-modulating the carrier wave of this pulse string is transmitted from the right exterior antenna 25 as the normal request signal (after demodulation) in this case. The third line from the top in FIG. 2 is a pulse string with the normal pulse string inverted and a signal obtained by ASK-modulating the carrier wave of this pulse string is transmitted from the left exterior antenna 24 as the inverse signal in this case.

The transmission output of the inverse signal may be basically set equal to that of the normal request signal, but it may be set at the transmission output different from the normal request signal from the viewpoint that the purpose (electric wave leaking area; impossible to receive a request signal in the B area and the like) will be properly achieved at the possible minimum output.

In Step S14, a defined request signal is transmitted from the transmission antenna on the left side (left exterior antenna 24) where the trigger occurred, on the contrary to Step S13 and at the same time, the inverse signal is transmitted from the transmission antenna on the opposite side (right exterior antenna 25).

Passing through Step S13 or S14, it is judged whether the normal answer signal has been received or not in the predetermined period of waiting reception in Step S15. More specifically, it is judged whether a signal including at a predetermined position the code that agrees with the ID code stored in the storing means on the vehicle side has been received through a receiving antenna. When the normal answer signal has been received in the predetermined period of waiting reception, this step proceeds to Step S16, where the processing will be finished when the reception waiting period elapses without receiving the normal answer signal.

Figures 5A, 5B:
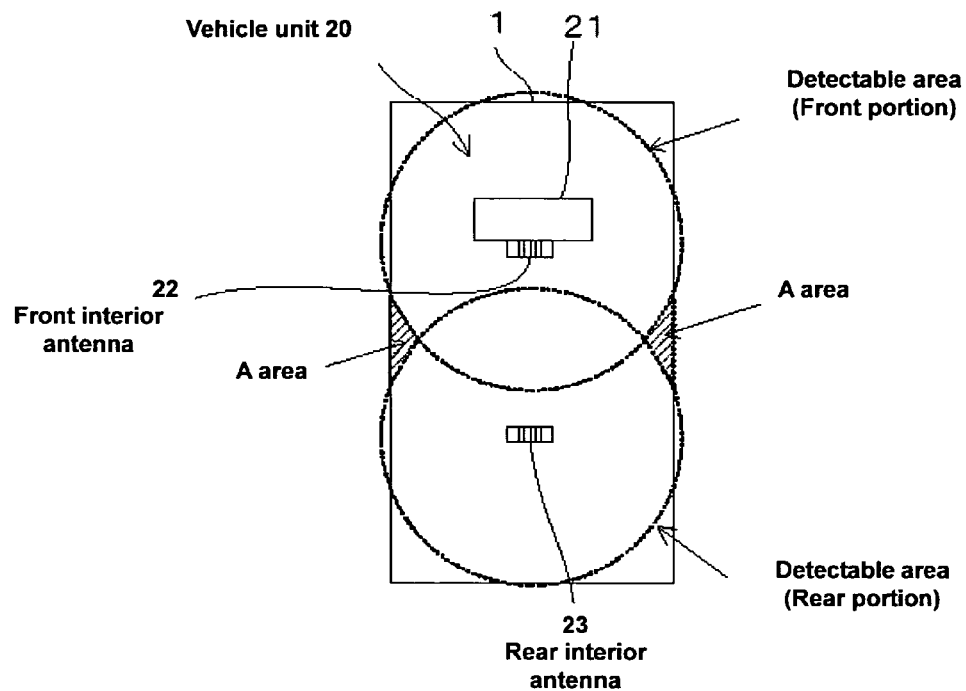
FIG. 5 is a view for use in describing the communicable area of an interior antenna.

In Step S16, as illustrated in FIG. 5B, the normal request signals are transmitted simultaneously from both the front interior antenna 22 and the rear interior antenna 23 and this step proceeds to Step S17.

In Step S17, similarly to Step S15, it is judged whether the normal answer signal has been received or not in the predetermined reception waiting period. When the normal answer signal has been received in the predetermined reception waiting period, the processing is finished and when the above reception waiting period elapsed without receiving the normal answer signal, this step proceeds to Step S18.

In Step S18, at last, control processing for a door unlocking operation is performed and the processing is finished.

Figure 1B:
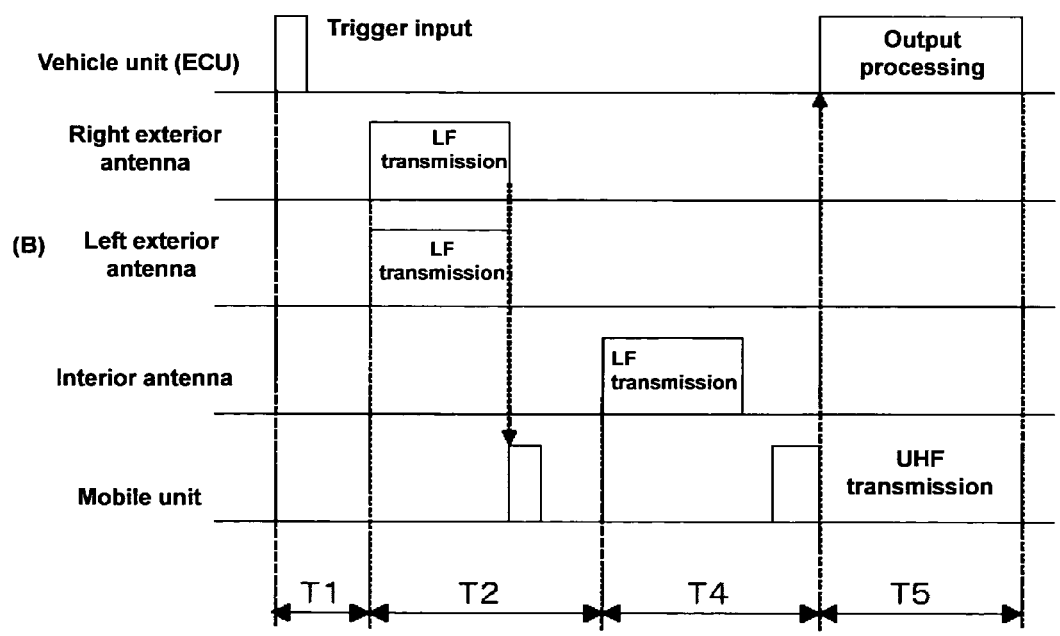

According to the processing as mentioned above, an unlocking operation will be realized according to the flow as shown in the timing chart of FIG. 1B.

When a driver carrying the mobile unit 10 approaches the driver's seat door (right door) of a locked vehicle and holds out his or her hand in order to try to open the door near the driver's seat, the door handle sensor (operational intention detecting means) on the side of the driver's seat not illustrated detects this and this detected signal is supplied to the control unit 21 as a trigger. Upon receipt of the trigger, according to the processing of Step S11 to Step S13 of the control unit 21, transmission of the normal request signal starts from the right exterior antenna 25 after elapse of the time T1 and at the same time, transmission of the above-mentioned inverse signal starts from the left exterior antenna 24. After elapse of the time T2 required to transmit the request signal from the right exterior antenna 25 and to receive the answer signal from the mobile unit 10 in reply to this, the transmission of the request signal starts from the front interior antenna 22 and the rear interior antenna 23. After finishing the transmission of the request signal from these interior transmission antennas and the receiving operation of the corresponding answer signal from the mobile unit 10 in reply to this, the control unit 21 controls the unlocking operation of a door according to the processing of Step S18 when the condition of automatically unlocking a door (it turns to be positive in the judgment of Step S15 and to be negative in the judgment of Step S17) is satisfied, and a series of operations (automatic unlocking operation) will be finished after elapse of the time T4 and T5 necessary for the above operations.

In this case, although the left exterior antenna 24 does not transmit the normal request signal, it is no problem. When the normal answer signal is received with respect to the request signal transmitted from the right exterior antenna 25 where the trigger occurred (in short, in the case of positive in the judgment of Step S15), it proves that at least the mobile unit 10 is not positioned at the left side of the vehicle (at the side opposite to the right where the trigger occurred).

This is why when the request signal is transmitted from the corresponding transmission antenna where the trigger occurred, an interrupt signal (the above-mentioned inverse signal in this case) for preventing reception of the request signal is transmitted from the transmission antenna arranged at the side opposite to the relevant position simultaneously with the request signal (refer to Steps S13 and S14). At the side opposite to the relevant position where the trigger occurred (for example, at the left side opposite to the right side of the vehicle where the trigger occurred), the request signal cannot be received normally (in this case, as illustrated in the bottom of FIG. 2, a data inverted signal with respect to the normal request signal is received), and therefore, the answer signal will not be returned. In the case of the above example, in FIG. 1A, when the request signal is transmitted from the right exterior antenna 25 where the trigger occurred, even when the mobile unit 10 is positioned at the above-mentioned B area (electric wave leaking area) on the left side of the vehicle, the mobile unit 10 cannot receive the normal request signal because of being interrupted by the interrupt signal from the left exterior antenna 24 and cannot return the answer signal.

In the normal case where the mobile unit 10 is positioned near the vehicle on the side where the trigger occurred (when a user generating the trigger carries the mobile unit 10 with him or her), the mobile unit 10 receives the signal as shown in the second line from the bottom in FIG. 2 and it is in a position to receive the normal request signal normally. On the side where the trigger occurred, the interrupt signal to be transmitted from the opposite side is completely attenuated so as not to affect the reception of the normal request signal.

In this case, the judgment becomes positive in Step S15, the judgment becomes negative in Step S17, and in Step S18, the automatic unlocking operation is assuredly performed.

When the mobile unit 10 is within the vehicle (for example, when a driver carrying the mobile unit 10 is inside the vehicle and the door is locked, or when the mobile unit 10 is left behind within the vehicle and the door is locked), basically the mobile unit 10 should receive the signal as shown in the third line from the bottom in FIG. 2 and it cannot receive the normal request signal normally. Even when a trigger occurs, the judgment result in Step S15 becomes negative, the automatic unlocking operation will never be performed and crime can be prevented and a proper automatic unlocking operation can be achieved.

Depending on the conditions such as the positional relation of the exterior antennas and the transmission output of the interrupt signal, when the mobile unit 10 is near the door on the side where the trigger occurred within the vehicle (near the exterior antenna where the normal request signal is transmitted), the mobile unit 10 will receive this normal request signal normally (in short, the judgment result becomes positive in Step S5), as illustrated in the second line from the bottom in FIG. 2, and there is a fear that the automatic unlocking operation may be improperly performed.

Therefore, in the embodiment, as mentioned above, after the transmitting operations of the request signal and the inverse signal from the exterior antennas and the receiving operation of the corresponding answer signal (that is, at the timing of the time T4 after the time T2), the transmitting operation of the request signal from the interior antenna and the receiving operation of the corresponding answer signal (Step S16 to Step S17) are performed and the automatic door unlocking operation (Step S18) is performed under necessary condition that the normal answer signal will not be received with respect to the request signal from this interior antenna (in short, the judgment result in Step S17 becomes negative).

According to this, even when a trigger occurs with the mobile unit 10 inside the vehicle, the automatic unlocking operation will be assuredly prevented, hence to enhance the crime prevention. This is why when the mobile unit 10 is within the vehicle, the mobile unit 10 assuredly returns the answer signal in reply to the request signal from the above interior antenna and the answer signal is received by the vehicle unit, and therefore, the judgment result in Step S17 becomes positive.

In the case of this embodiment, in particular, as illustrated in the second line and the third line from the top in FIG. 5B, the normal request signals are transmitted simultaneously from both the front interior antenna 22 and the rear interior antenna 23. Then, as illustrated in the fourth line from the top (the bottom line) in FIG. 5B, because of the combination of electric waves, the amplitude of a signal is increased more than in the case of individual transmission from each antenna, and the mobile unit 10 can receive the request signal normally, even in the area outside the communicable area (A area shown in FIG. 5A) where it is difficult to receive signals in the case of individual transmission from each antenna. As a result, the above function (when the mobile unit is within the vehicle, no door will be automatically unlocked) will be realized with more reliability.

According to the smart entry system of this embodiment, in order to judge the position of the mobile unit 10, it is not necessary to sequentially communicate with the respective transmission antennas having no trigger nor transmit the above-mentioned prohibition signals individually from the transmission antennas having no trigger, hence to shorten the whole delay time much more than according to the conventional art.

Figure 6A:
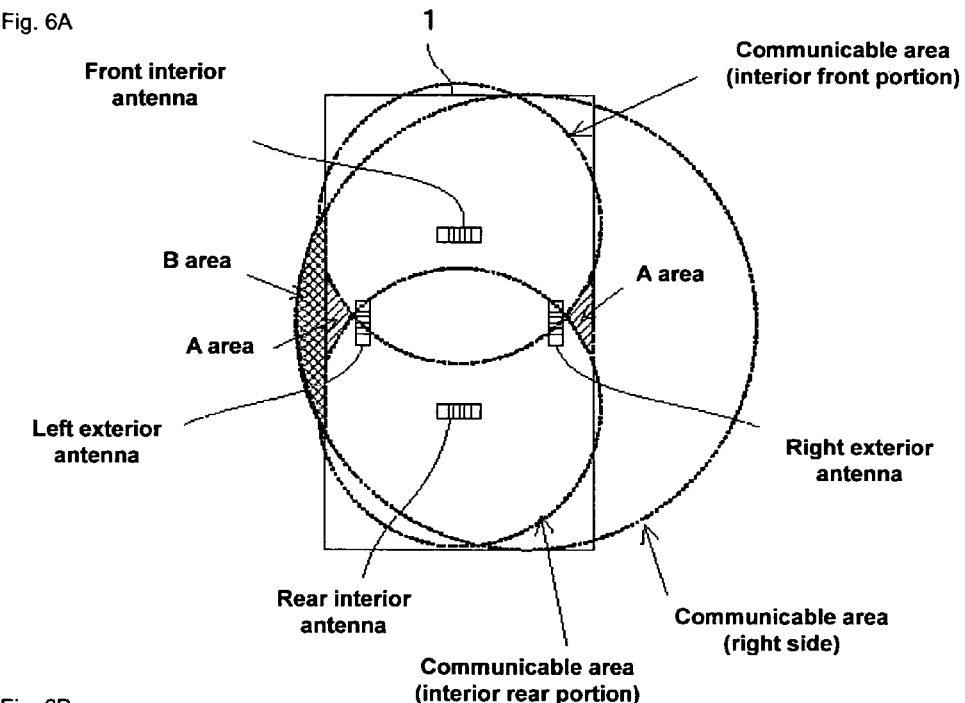
FIG. 6 is a view for use in describing the conventional vehicular smart entry system.
Figure 6B:
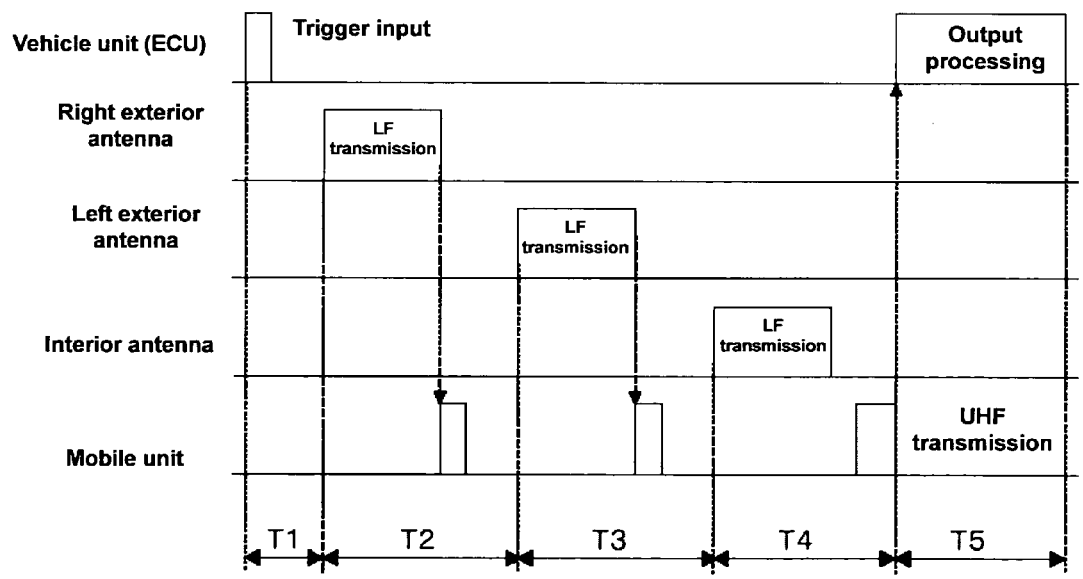

For example, when this is compared with the conventional art shown in FIG. 6B, as apparent from FIG. 1B, the whole delay time can be shortened extremely by the time T3 required to communicate with the exterior antenna on the opposite side.

In the example of FIG. 4, although only the door unlocking operation has been described, the same effect can be obtained when the invention is applied to the door locking operation. Specifically, when the condition that can trigger the transmission of a request signal in the door locking operation mode (for example, the door is closed and a driver's hand is removed away from the door knob, or a switch button provided near the door knob is operated and the locking operation is instructed) is satisfied, the request signal is transmitted form the exterior antenna on the side of having the trigger and simultaneously an interrupt signal is transmitted from the exterior antenna on the opposite side. According to this, additional operations such as transmitting a request signal and a prohibition signal from the exterior antenna on the opposite side separately are not required, hence to shorten the delay time extremely.

Figure 11:
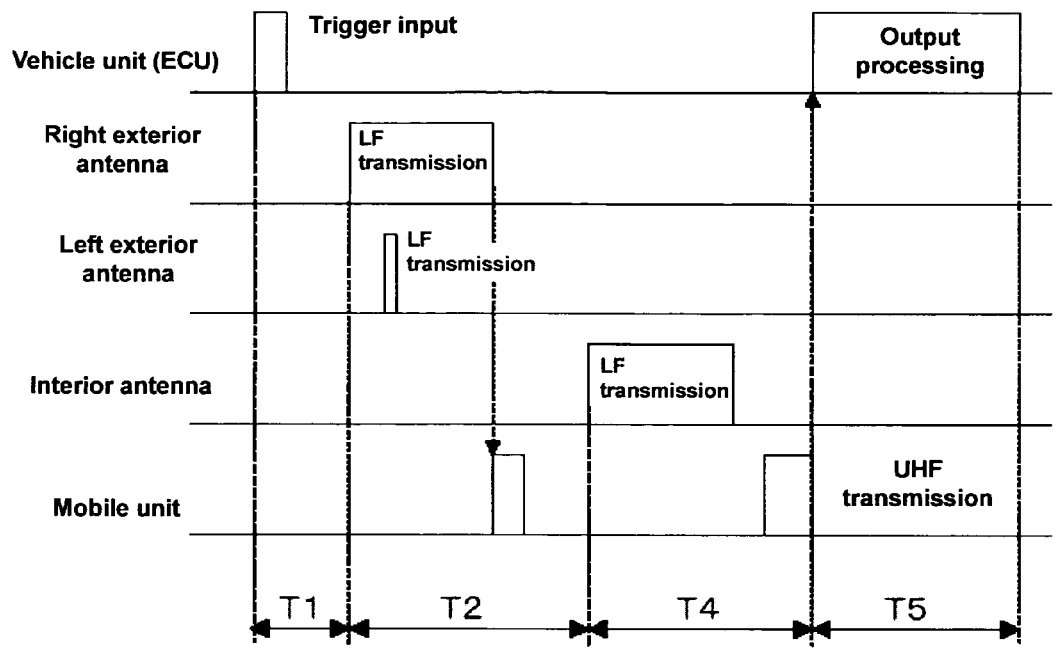
FIG. 11 is a view for use in describing the operation of the vehicular smart entry system (second embodiment) and the transmission waveform and the reception waveform of a signal to be transmitted from the exterior antenna.

A second embodiment of the vehicular remote control system will be described according to FIG. 11.

As mentioned above, an interrupt signal may be transmitted simultaneously at least at one moment of the period during which a request signal is being transmitted. The second embodiment has such a characteristic. In this case, as illustrated in FIG. 11B, the interrupt signal is supplied to the initial pulse whose data is "0", of the pulse string of the request signal and it is not supplied to the other pulses. In other words, such an interrupt signal is supplied that only one pulse (the initial pulse that becomes "0") is inverted of the pulse string of the request signal. Thus, the interrupt signal is transmitted only at one moment of the time period during which the request signal is being transmitted, as illustrated in FIG. 11A, hence to decrease the load of the transmitting circuit.

In the second embodiment, although the interrupt signal is transmitted to only the initial pulse that takes "0", needless to say, it is not restricted to this mode. For example, the interrupt signal may be transmitted to the initial pulse that takes "1". Alternatively, the interrupt signal may be transmitted to only a specific pulse, like the first one pulse or the first two pulses. Alternatively, only when the waveform of a request signal first becomes L level (low level), the waveform of the H level (high level) may be transmitted as an interrupt signal.

Figure 12:
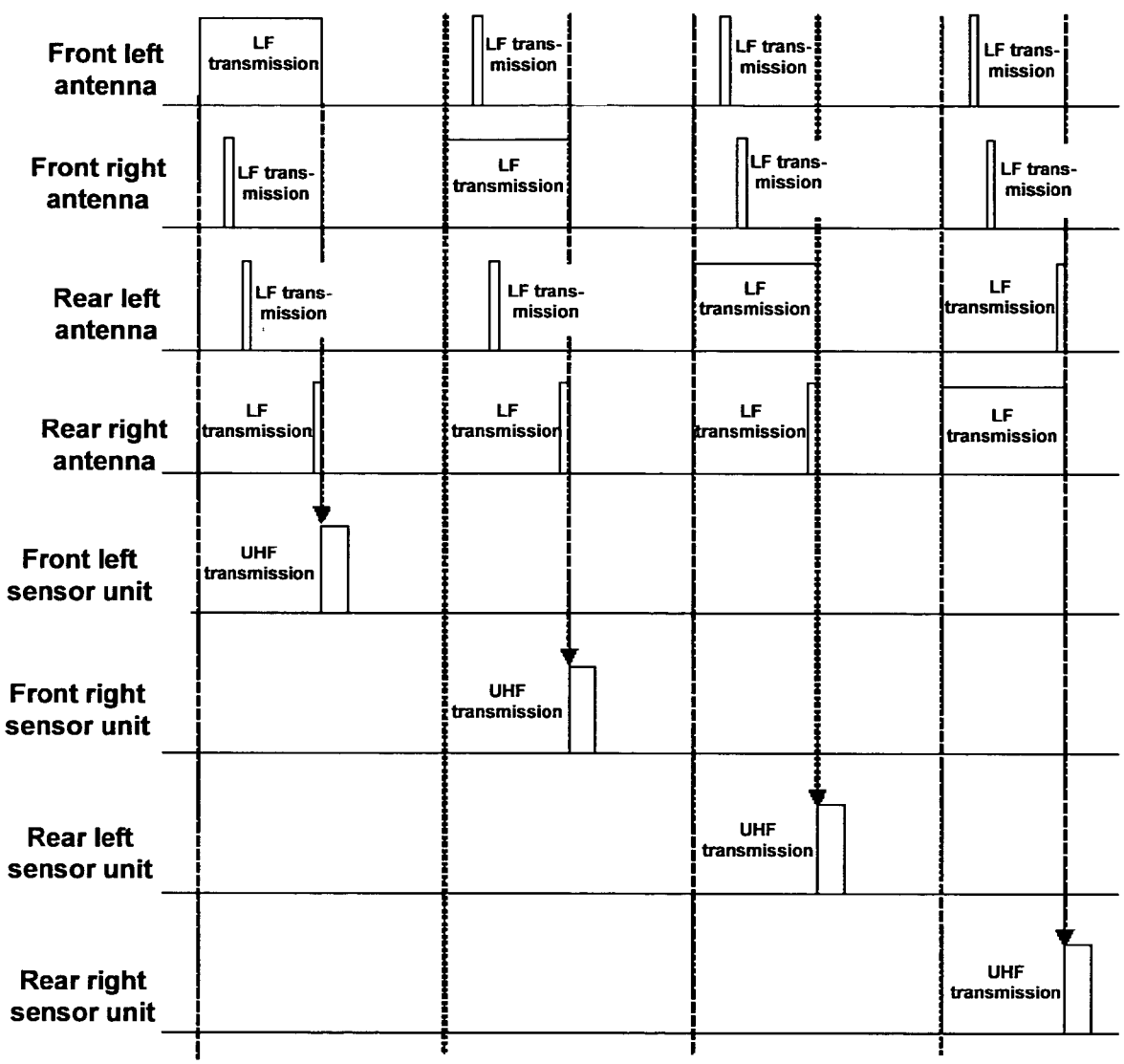
FIG. 12 is a view for use in describing the operation of the tire air pressure monitoring system (second embodiment).

When there are a plurality of transmission antennas to transmit interrupt signals (when a transmission antenna is provided also on a rear door as described later), the interrupt signals are not transmitted at once by these transmission antennas but as mentioned above, it is preferable that they are transmitted with time deference. When the interrupt signals are transmitted at once, the load of the transmitting circuit becomes heavy, while when they are transmitted with time deference, the load of the transmitting circuit becomes light. For example, when the request signal firstly becomes "0", an interrupt signal (signal consisting of only the pulse obtained by inverting a pulse that firstly becomes "0") is transmitted from the first transmission antenna, when the request signal becomes "0" secondly, an interrupt signal (signal consisting of only the pulse obtained by inverting a pulse that becomes "0" secondly) is transmitted from the second transmission antenna. Like this, each interrupt signal obtained by inverting only one of the pulse string may be sequentially transmitted from each transmission antenna (FIG. 12 and FIG. 13).

The invention (vehicular remote control system of this application) is not restricted to the above-mentioned embodiment, but various modifications and applications can be made.

For example, although in the above-mentioned embodiments, operational intention detecting means and its corresponding transmission antenna on the vehicle side are provided on the both sides; left and right sides, the invention may be applied to a system including the above at three and more positions. More specifically, operational intention detecting means (sensor or switch) and the corresponding transmission antenna on the vehicle side may be provided on the side of a rear door (back seat door) or a trunk (at a rear side of the vehicle). When a user approaches the rear side and a trigger occurs there, a request signal may be transmitted from the transmission antenna on the rear side and simultaneously an interrupt signal may be transmitted from the other transmission antennas (right exterior antenna and left exterior antenna), in a system of locking/unlocking or opening/closing the rear door or the trunk as well as the left and right doors. Then, an extra operation such as transmitting a request signal and a prohibition signal from another exterior antenna separately is not required, hence to realize high crime prevention and to extremely shorten the delay time necessary for the automatic locking/unlocking operation of the rear door.

An interrupt signal may be transmitted not only from the other exterior antenna but also from an interior antenna. According to this, the mobile unit within the vehicle can prevent a request signal from the exterior antenna from being received with high reliability. When an interrupt signal is transmitted from the interior antenna, it is preferable that the interrupt signal is transmitted with time difference at one of the period during which a request signal is being transmitted.

It is possible to omit the operation of transmitting a request signal separately from the interior antenna and communicating with the mobile unit, in the locking/unlocking operation of the above-mentioned embodiment (smart entry system). This is why when the mobile unit is within the vehicle, there is a possibility of designing in that a request signal from the exterior antenna cannot be received normally anywhere inside the vehicle, depending on the specifications including the positional relation of the exterior antennas and their transmission output of the interrupt signal or the output of the interrupt signal also from the interior antenna. In this case, it is not necessary to transmit a request signal separately from the interior antenna in order to confirm whether the mobile unit is within the vehicle or not.

Since the separate communication operation from the interior antenna to the mobile unit can be omitted, the time T4 in FIG. 1B can be saved and the delay time can be remarkably shortened to the same degree of the basic operation time (it means the time required for the basic operation to transmit a request signal from the transmission antenna where a trigger occurred and to perform a predetermined control operation based on the answer signal from the mobile unit in reply to the request signal and the total of the time T1, T2, and T5 in FIG. 1B).

The invention is not restricted to the smart entry system of the above-mentioned embodiments, but it can be applied to, for example, based on operational intention detection such as driver's approach with a mobile unit or switching operations (generation of input trigger), an electrically operated automatic slide door, a system for automatically starting an engine of a vehicle and for automatically permitting the engine start (the operation of the immobilizer), and a system for automatically starting an air conditioner of a vehicle, and the same effect can be obtained.

(Embodiment of a Tire Air Pressure Monitoring System)

This time, preferred embodiments of the tire air pressure monitoring system will be described.

At first, a first embodiment will be described.

Figure 7A:
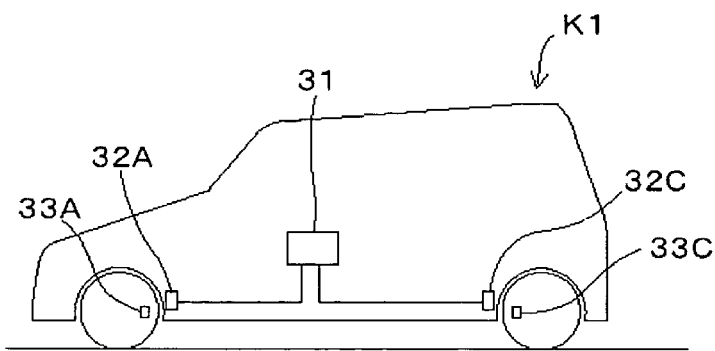
FIG. 7 is a view for use in describing the structure of a tire air pressure monitoring system.
Figure 7B:
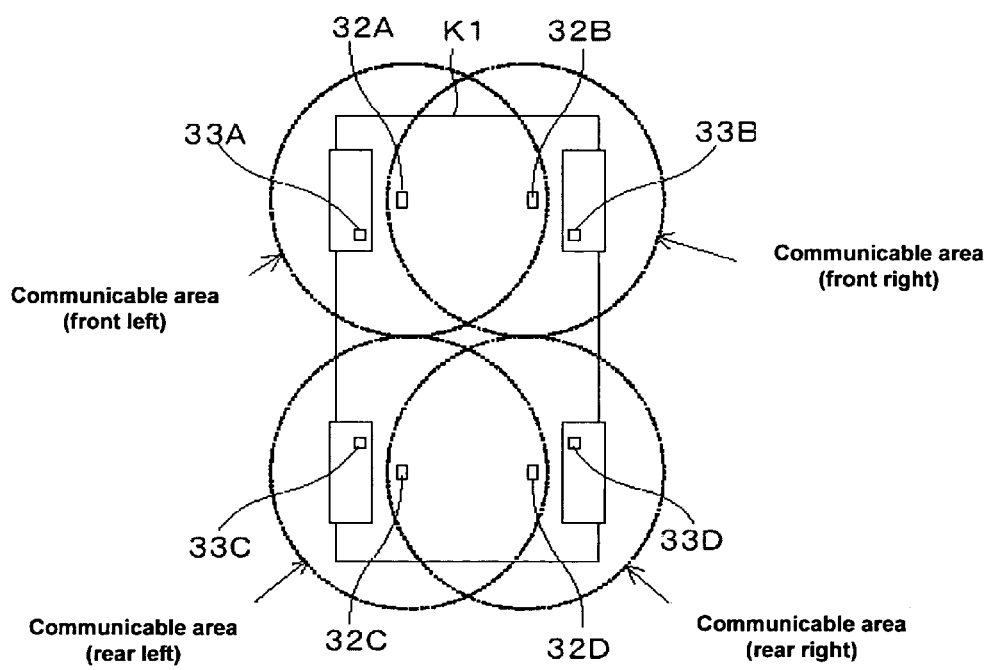
Figure 8:
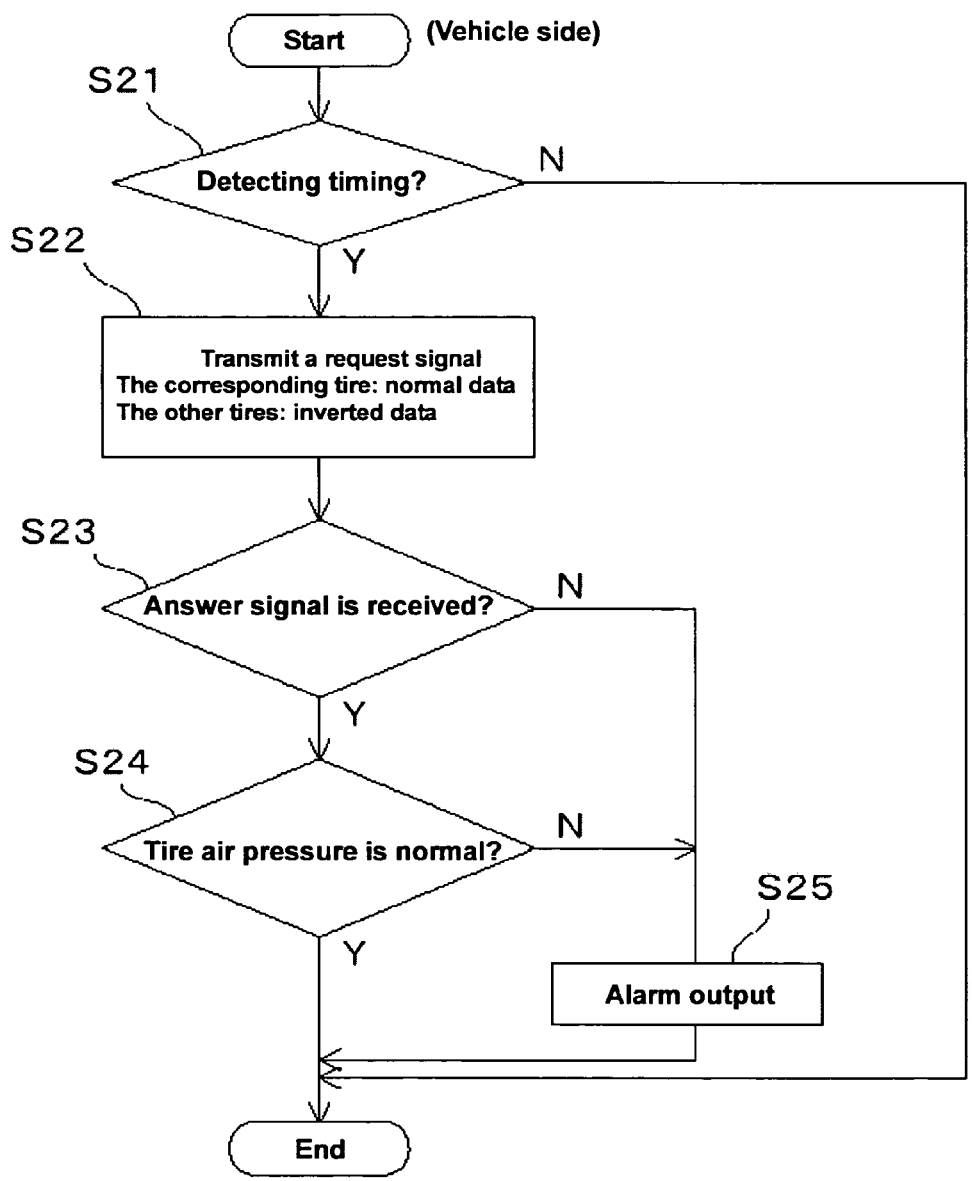
FIG. 8 is a flow chart for use in describing the operation of a controller on the vehicle side.

FIG. 7A is a view showing a vehicle K1 provided with the tire air pressure monitoring system (TPMS) of this embodiment, and FIG. 7B is a view for use in describing a communicable area of a transmission antenna on the vehicle side of this system. FIG. 8 is a flow chart for use in describing the operation of a controller on the vehicle side.

The vehicle K1 is a four-wheeled vehicle in this case, and as illustrated in FIG. 7A, it comprises a controller on the vehicle side 31, transmission antennas 32A to 32D on the vehicle side, and sensor units 33A to 33D as elements forming the TPMS.

The controller 31 on the vehicle side is a controller of the TPMS provided within a predetermined control box within the vehicle, which comprises a controlling circuit formed by a microcomputer not illustrated, a wireless signal communication circuit (transmitting circuit of LF waves and receiving circuit of UHF waves), and a receiving antenna (receiving antenna of UHF waves). The controller 31 on the vehicle side regularly performs the monitoring processing of air pressure of each tire (the details will be described later), and when there is a tire having an inadequate air pressure, the TPMS works to output an alarm indicating the relevant tire and the abnormal air pressure (alarm in sound or light or character display) hence to inform a driver.

The power consumption of the controlling circuit of the controller 31 on the vehicle side is restrained at the minimum by designing it to work only when the tire air pressure monitoring is required (for example, at the time of engine start).

The respective transmission antennas 32A to 32D on the vehicle side are provided in the vicinity of the respective tires (near the tire houses of the respective tires) and they are to transmit request signals (LF waves) to the sensor units 33A to 33D of the respective tires according to a control of the controller 31 on the vehicle side.

Each of the sensor units 33A to 33D, provided within each tire, comprises a controlling circuit (for example, formed by a microcomputer), not illustrated, a tire air pressure sensor for measuring the air pressure of each tire, a transmitting circuit and a transmission antenna for wireless transmitting the air pressure data measured by the sensor as an answer signal (UHF wave), and a receiving circuit and a receiving antenna for receiving the request signal.

Each of the controlling circuits of the sensor units 33A to 33D is usually in a standby mode that is the power saving mode and it properly switches from the standby mode to the normal mode (in the working mode not the standby mode).

When it receives a signal of the defined intensity and more (before demodulation) at a defined frequency corresponding to a request signal, it moves to the normal mode and performs the receiving processing of this signal and checks whether this signal is the normal request signal or not. More specifically, the received signal (binary data string after demodulation) is analyzed, it is judged whether or not the same data as the ID code inherent in the vehicle previously stored is included in a predetermined position (for example, ID unit) of the received signal and in the positive case, it is judged to be the normal request signal.

When it is judged to be the normal request signal in the above judging processing, the controlling circuit transmits an answer signal including the ID code and the latest air pressure data of the mounted tire a predetermined number of times. When it is not judged to be the normal request signal in the above judging processing and when the transmission of the above answer signal is completed, it returns to the standby mode and waits for another signal input.

According to FIG. 8, one example of the air pressure monitoring processing of the controller 31 on the vehicle side will be described.

The controlling circuit of the controller 31 on the vehicle side performs the air pressure monitoring processing as shown in FIG. 8 on each tire after activation.

The air pressure monitoring processing is at first to judge whether it is a predetermined detecting timing or not in Step S21. The detecting timing means a timing to read and check the air pressure of a tire to be detected. For example, it is the timing of having each order of the detected tires when each air pressure of the left front tire, the right front tire, the left rear tire, and the right rear tire is sequentially confirmed.

When it is at the detecting timing, this step proceeds to Step S22, while when it is not at the detecting timing, the processing is completed.

In Step S22, a defined request signal is transmitted from a transmission antenna on the vehicle side corresponding to the detected tire and at the same time, an inverse signal (interrupt signal) is transmitted from another transmission antenna on the vehicle side (at least the transmission antenna on the vehicle side opposite to either of the left and right sides).

For example, when the detected object is the tire on the left front side, a request signal of the normal data is transmitted from the transmission antenna 32A on the vehicle side and at the same time, an inverse signal as an interrupt signal is transmitted from each of the other transmission antennas 32B to 32D on the vehicle side.

The inverse signal as the interrupt signal may be transmitted in the whole time period during which the request signal is being transmitted, or it may be transmitted at least at one moment of the time period during which the request signal is being transmitted. Even at one moment, it can be prevented from being received as the normal request signal.

The inverse signal means a signal obtained by inverting the pulse string (digital signal) at the modulation time, with respect to the normal request signal, similar to the first embodiment of the vehicular remote control system (FIG. 2). For example, as illustrated in the third to the fifth lines from the top in FIG. 10, it means the signal obtained by inverting the whole pulses of the request signal (the second line from the top in FIG. 10).

The inverse signal may be basically set at the same transmission output as the normal request signal, or it may be set at the transmission output different from the normal request signal from the viewpoint of properly achieving its object (a request signal should be prevented from being received by the sensor units of the other tires) at the possible minimum output.

Passing through Step S22, it is judged whether the normal answer signal has been received or not in a predetermined reception waiting period in Step S23. Specifically, it is judged whether the signal including a code that agrees with the ID code inherent in the vehicle previously stored at a predetermined position has been received through a receiving antenna. When the normal answer signal has been received in the predetermined reception waiting period, this step proceeds to the next Step S24, while when the reception waiting period elapsed without receiving the normal answer signal, this step proceeds to Step S25 where alarm is supplied for confirmation.

In Step S24, the measured data of the air pressure included in the received answer signal is read out and it is judged whether this measured data is normal or not (for example, whether the air pressure is within a proper range or not). When it is normal, the processing is finished, while when it is not normal, this step proceeds to Step S25.

In Step S25, a control for supplying an alarm (alarm in sound or light or character display) indicating that the air pressure of the tire to be detected is abnormal is performed and the processing is finished.

When the normal answer signal cannot be received in Step S23, it proceeds to another step different from Step S25, where another alarm indicating that such an abnormal has occurred that it cannot communicate with the sensor unit of the detected tire may be supplied.

As mentioned above, according to the air pressure monitoring processing, a request signal and an answer signal can be transmitted and received between each sensor unit of each tire and the controller 31 on the vehicle side at a predetermined detecting timing, and when the answer signal cannot be received by the controller 31 on the vehicle side, or when the air pressure measured data included in the received answer signal is abnormal, an alarm is supplied, hence to realize a function as the TPMS.

Figure 9:
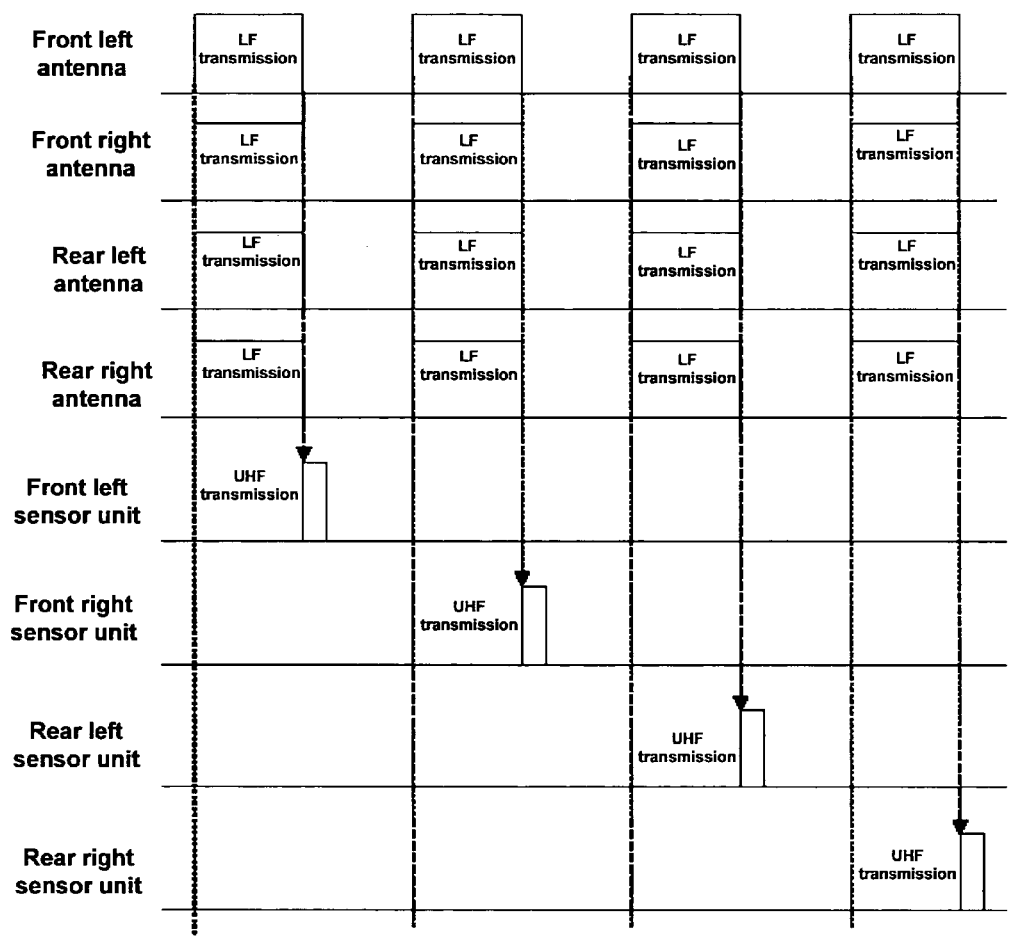
FIG. 9 is a view for use in describing the operation of a tire air pressure monitoring system.

As illustrated in FIG. 9, when a request signal is transmitted from a transmission antenna on the vehicle side at a specified position, each interrupt signal (for example, the inverse signal) for preventing reception of this request signal is transmitted from each of the transmission antennas on the vehicle side arranged at the positions other than the specified position simultaneously with this request signal. Therefore, any request signal cannot be normally received by the sensor units of the tires other than the relevant tire, hence to assuredly prevent the return of answer signals.

Specifically, no request signal can be received normally (in this case, a signal with the data of the normal request signal inverted is received, for example, as illustrated in the bottom of FIG. 10) in the sensor units of the tires (for example, the sensor unit of the tire on the right front side) other than the relevant tire (for example, on the left front side) and no answer signal will be returned therefrom. The sensor unit of the relevant tire (for example, on the left front side) normally receives the signal as shown in the second line from the bottom in FIG. 10, that is the normal request signal. In the relevant position, the interrupt signals to be transmitted from the other positions are fully attenuated so as not to affect the reception of the normal request signal.

According to the tire air pressure monitoring system of this embodiment, it is possible to solve the above-mentioned problem of making communication intricate without undesirable effects. In other words, the above-mentioned special processing (for example, the processing of, with an identification code set for every tire, checking the identification codes in the sensor unit) becomes unnecessary. This improves the response ability (delay time required for tire air pressure monitoring is shortened) and the setting of each sensor unit does not have to be changed depending on tires, and therefore, there is an advantage that management of the sensor units becomes easier and that workability at the assemble time can be improved.

When the communicable areas of the respective transmission antennas on the vehicle side can be assuredly and stably set as illustrated, for example, in FIG. 7B, since there exists only the sensor unit of the tire corresponding to the transmission antenna on the vehicle side within the communicable area, it is possible to return the data to only the sensor unit of the corresponding tire without transmission of the above-mentioned interrupt signal. This setting, however, may be difficult actually in many cases and there occurs the above problem of making communication intricate (for example, a request signal supplied from the left front antenna 32A to the sensor unit 33A on the left front side may be received also by the sensor unit 33B on the right front side and an answer signal may be returned also from this sensor unit 33B). According to the tire air pressure monitoring system of this embodiment can solve this problem without undesirable effects such as deterioration of the response ability.

A second embodiment of the tire air pressure monitoring system will be described according to FIG. 12 and FIG. 13.

As mentioned above, an interrupt signal may be transmitted at least at one moment of the time period during which a request signal is being transmitted, and preferably, it should be transmitted with time difference. The second embodiment has such characteristic. In this case, as illustrated in FIG. 13, a request signal (in the second line from the top in FIG. 13) is transmitted from the transmission antenna on the vehicle side arranged at a specified position (for example, on the left front side), the first transmission antenna on the vehicle side other than that the above antenna at the specified position (for example, the right front transmission antenna on the vehicle side) supplies an interrupt signal to the initial pulse only whose data is "0", of the pulse string of the request signal and supplies no signal to the other pulses. The second transmission antenna on the vehicle side other than that at the specified position (for example, the left rear transmission antenna on the vehicle side) supplies an interrupt signal to the second pulse only whose data is "0", of the pulse string of the request signal and supplies no signal to the other pulses. The third transmission antenna on the vehicle side other than that at the specified position (for example, the right rear transmission antenna on the vehicle side) other than that at the specified position supplies an interrupt signal to the third pulse only whose data is "0", of the pulse string of the request signal and supplies no signal to the other pulses. In other words, each interrupt signal with one (0 pulse) of the pulse string of the request signal inverted is supplied sequentially from the respective transmission antennas on the vehicle side other than that at the specified position with time difference.

Thus, as illustrated in FIG. 12, the period of the time when an interrupt signal is being transmitted is only a little moment of the time period during which a request signal is being transmitted and since each interrupt signal is not transmitted simultaneously from a plurality of transmission antennas on the vehicle side (the respective transmission antennas on the vehicle side other than that at the specified position), the load of a transmitting circuit can be decreased. In the case of this embodiment, in particular, as apparent from FIG. 13, the number of antennas (the number of tires) which actually transmit electromagnetic waves at the same time is always 1 and less, including all the cases of the normal request signal and the interrupt signal, and the load of the transmitting circuit is very light.

Although the second embodiment is designed to transmit each interrupt signal to the pulse of "0" sequentially from the respective antennas, needless to say, it is not restricted to this mode. For example, each interrupt signal may be transmitted to the pulse of "1" sequentially from the respective antennas. Alternatively, an inverse signal (interrupt signal) for one pulse may be transmitted to each pulse sequentially from each of the antennas, like an inverse signal may be transmitted to the first pulse from the first transmission antenna other than that at the specified position and an inverse signal may be transmitted to the second pulse from the second transmission antenna other than that at the specified position. When the waveform of a request signal becomes L level (low level), the waveform of the H level (high level) may be transmitted as an interrupt signal sequentially from the respective antennas.

The invention (this tire air pressure monitoring system) is not restricted to the above-mentioned embodiments, but various modification and applications can be made.

For example, it is not always necessary to have a transmission antenna on the vehicle side and a tire in a one-to-one correspondence. The invention can be applied to a system where one transmission antenna on the vehicle side is provided for the front and rear tires on the right side and one transmission antenna on the vehicle side is provided for the front and rear tires on the left side.

It is not always necessary to transmit the interrupt signals from all the transmission antennas on the vehicle side that transmit no normal request signal. A transmission antenna on the vehicle side that cannot cause the problem of making communication intricate does not have to transmit an interrupt signal.

What is claimed is:

1. A vehicular remote control system comprising
 a mobile unit portable by a user,
 a vehicle unit for establishing bidirectional wireless communication with the mobile unit, wherein the vehicle unit is able to transmit a wireless signal to the mobile unit through transmission antennas provided at a plurality of positions of a vehicle, and
 operational intention detection means, provided at the plurality of positions of the vehicle corresponding to the transmission antennas, for detecting operational intention of a user approaching the positions, wherein
  when a user's operational intention is detected by the operational intention detecting means, the detected operational intention works as a trigger, and a predetermined request signal is transmitted from the vehicle unit to the mobile unit through a first transmission antenna arranged at a position of the vehicle corresponding to a triggered position, and the vehicle unit performs a predetermined processing operation according to a received result of an answer signal transmitted from the mobile unit in reply to the request signal, and
  at the same time when the request signal is transmitted through the first transmission antenna at the triggered position, the vehicle unit transmits an interrupt signal for preventing reception of the request signal through a second transmission antenna arranged at a non-triggered position, at least while the request signal is being transmitted.

2. The vehicular remote control system according to claim 1, wherein the interrupt signal is transmitted from the respective transmission antennas arranged at the non-triggered position, with time difference.

3. The vehicular remote control system according to claim 1, wherein the request signal is a signal of digital wireless method to be transmitted after modulation of carrier wave with a pulse string of digital data, and the interrupt signal is an inverse signal with the pulse string at the modulation inverted with respect to the request signal.

4. The vehicular remote control system according to claim 1, wherein the processing operation is control processing for locking/unlocking or opening/closing a door or a trunk of the vehicle, the transmission antennas and the operational intention detecting means are provided on both sides of a vehicle having doors or on a rear side of a vehicle having the trunk, and the operational intention is for locking/unlocking or opening/closing the door or the trunk of the vehicle.

5. A tire air pressure monitoring system comprising
a controller on a vehicle side able to transmit a wireless signal through each transmission antenna on the vehicle side provided for every specified tire of the vehicle in the vicinity of each corresponding tire, and
a sensor unit, provided in each tire of the vehicle, able to measure air pressure of each tire and transmit the measurement result as wireless signal, wherein
the controller on the vehicle side transmits a request signal to the sensor unit of the corresponding tire through a first transmission antenna on the vehicle side at a predetermined position at a predetermined timing, and upon receipt of the request signal, the sensor unit transmits an answer signal including the measurement result to the controller on the vehicle side, and
at the same time when transmitting the request signal through the first transmission antenna on the vehicle side at the predetermined position, the controller on the vehicle side transmits an interrupt signal for preventing reception of the request signal through a second transmission antenna on the vehicle side arranged at a position other than the predetermined position, at least while the request signal is being transmitted.

6. The tire air pressure monitoring system according to claim 5, wherein the interrupt signal is transmitted from each of the transmission antennas arranged at a position other than the predetermined position, with time difference.

7. The tire air pressure monitoring system according to claim 5, wherein the request signal is a signal of digital wireless type to be transmitted after modulation of carrier wave with a pulse string of digital data, and the interrupt signal is an inverse signal with the pulse string at the modulation inverted with respect to the request signal.

* * * * *